United States Patent [19]

Yates et al.

[11] 4,412,654

[45] Nov. 1, 1983

[54] LAMINAR MICROJET ATOMIZER AND METHOD OF AERIAL SPRAYING OF LIQUIDS

[75] Inventors: Wesley E. Yates; Robert E. Cowden; Norman B. Akesson, all of Davis; Paul M. Horgan, Woodland, all of Calif.

[73] Assignee: The Regents of the University of California, Berkeley, Calif.

[21] Appl. No.: 301,432

[22] Filed: Sep. 11, 1981

[51] Int. Cl.³ .............................................. B64D 1/18
[52] U.S. Cl. .................................... 239/171; 239/597
[58] Field of Search ............. 239/597, 171, 568, 434.5

[56] References Cited

U.S. PATENT DOCUMENTS

| | | | |
|---|---|---|---|
| 3,410,489 | 11/1968 | Waldrum | 239/171 |
| 3,887,129 | 6/1975 | Brown | 239/171 |
| 3,994,437 | 11/1976 | Kitterman | 239/171 |

FOREIGN PATENT DOCUMENTS 1507607  4/1978  United Kingdom ................ 239/171

OTHER PUBLICATIONS

John Kirch, The Microfoil Boom; Agrichemical West, Dec. 1968, pp. 16–17.

*Primary Examiner*—John J. Love
*Assistant Examiner*—Jon M. Rastello
*Attorney, Agent, or Firm*—Lothrop & West

[57] ABSTRACT

A laminar microjet atomizer and method of aerial spraying involve the use of a streamlined body having a slot in the trailing edge thereof to afford a quiescent zone within the wing and into which liquid for spraying is introduced. The liquid flows from a source through a small diameter orifice having a discharge end disposed in the quiet zone well upstream of the trailing edge. The liquid released into the quiet zone in the slot forms drops characteristic of laminar flow. Those drops then flow from the slot at the trailing edge of the streamlined body and discharge into the slipstream for free distribution.

4 Claims, 2 Drawing Figures

LAMINAR MICROJET ATOMIZER AND METHOD OF AERIAL SPRAYING OF LIQUIDS

This invention was made with Goverment support under grant No. 23-181, awarded by the Department of Agriculture. The Government has certain rights in this invention.

BRIEF SUMMARY OF THE INVENTION

A closed front, hollow airfoil shaped body such as an airplane wing has an open slot at the trailing edge thereof. Liquid from a source in the streamlined body is released through one or more small orifices in a transverse plate well within the hollow body. The orifice axes extend in the direction of advance. The orifices are located in a quiet or protected zone within the body in advance of and opening through the slot in the trailing edge thereof.

Figure 1:
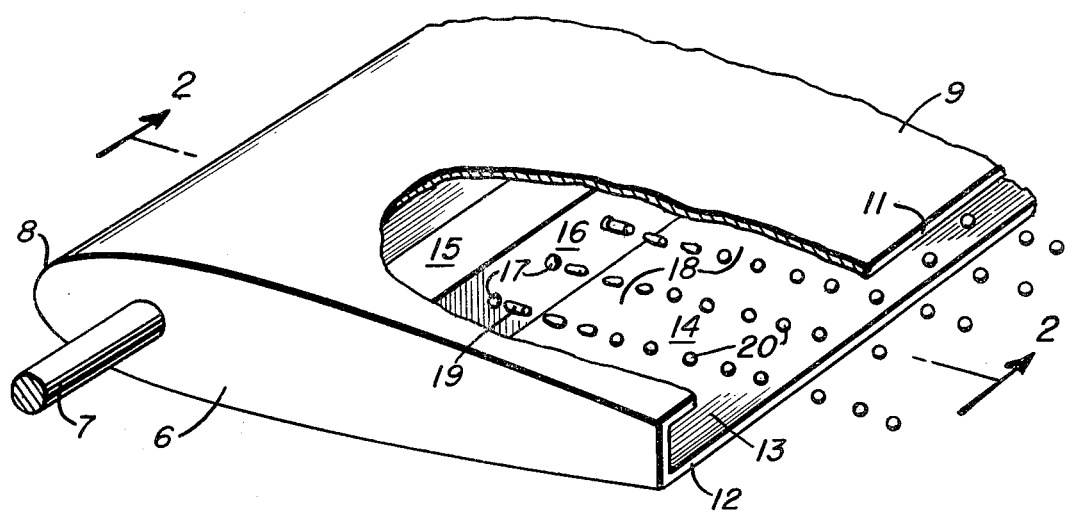
FIG. 1 is a view in isometric perspective, portions being broken away to reduce the figure size and other portions being broken away, showing the interior construction of the atomizing apparatus of the invention incorporated with a specially formed streamlined body, particularly an aircraft wing.
Figure 2:
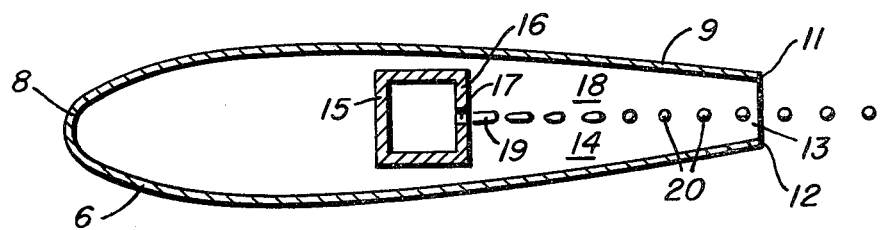
FIG. 2 is a cross-section, the plane of which is indicated by the line 2—2 of FIG. 1.

It is to be noted that the drawings herein are not to scale or are not dimensional since many of the dimensions and relationships herein are too small to be shown to scale.

DETAILED DESCRIPTION

There is a considerable need for the careful release of spray materials, usually in agricultural areas, and for various reasons. This is ordinarily accomplished by releasing the spray liquid from an airplane flying over the desired areas. Customarily, the drop formation is haphazard or random so that the spray does not effectuate the intended purposes as well as desired. It has been determined that much of the difficulty arises from random or inconsistent and uncontrolled formation of liquid droplets for the spray.

In order to overcome the problems of aerial spraying and to provide an improved spray formation and production of an improved spray pattern, we have provided a particular streamlined body such as an aircraft wing 6. While the streamlined body may be of any sort and may be used in various environments, the arrangement herein is readily adapted for use in an airplane and so is described in that environment. This wing may be part of a usual aircraft structure, diagrammatically illustrated at 7, and has the customary streamlined configuration in end elevation. The wing departs from the normal shape in that while the closed leading edge 8 of the wing is standard, the trailing edge 9 thereof is made up of an upper edge 11 and a spaced, lower edge 12 lying on opposite sides of an open slot 13. The slot opens into the undisturbed, quiet interior 14 of the wing and terminates rather abruptly in a transverse vertical plane at the trailing margin of the wing.

In the interior of the wing there is provided a reservoir 15 or source for liquid to be sprayed. Conveniently, this is a transversely extending tube square in cross-section to provide a trailing face 16. The liquid discharges from the tube 15 through a plurality of relatively small orifices 17 etched through the face 16 and arranged in a transverse line and with the axis of each orifice disposed longitudinally in a horizontal plane. The orifices are of the order of 100 microns in diameter and open within the interior of the wing and are spaced substantially from the trailing edge 9 thereof and within a quiet zone 18. The orifices 17 are all in substantially the same transverse vertical plane so that they all are well ahead of and out of the slipstream of the wing. They all are well within the quiet or protected volume inside the wing itself.

In the use of the device in a high velocity air stream; for example, with the wing flying, liquid flows out in a laminar fashion through the parallel orifices 17 and forms laminar liquid jets 19 that break up longitudinally into drops 20 of the generally desired spherical form. That is because the drop formation is not subject to extraneous aerodynamic forces. The drops form spherically in a protected, laminar flow position. The droplets travel rearwardly, as shown, and finally emerge from the interior of the wing. They emerge through the slot 13 at the trailing edge of the wing and only then become subject to the high velocity but low turbulence airstream behind the wing. The emerged drops are accelerated smoothly in line. Any small satellite drops coalesce with the larger droplets due to the different drag forces on the drops. Having started substantially at a uniform location as laminar jets in a quiet area, the jets tend to disperse quite uniformly. This provides an ultimate nearly uniform size of drops of the desired nature as the uniform droplets leave the spray device consistently to settle on the area being sprayed.

The method of the invention is concomitant with the structure provided and includes the origination of drops from relatively small orifices open to a liquid reservoir. The drops form in a protected zone so that their shape is not disturbed during formation by turbulent, ambient conditions. The drops so formed in a laminar flow region are then released into non-turbulent zones behind the streamlined body for deposition.

It is helpful under certain circumstances to vary the operation by providing within the reservoir 15 or at the orifices, a variation in internal pressure or a vibration to afford a pulsing effect on the liquid. This is accomplished by any appropriate means (not shown) such as a vibrating diaphragm or the like. The vibration or pulsing is not always utilized, but under certain circumstances and with certain materials, is found to be helpful.

We claim:

1. A laminar microjet atomizer comprising a hollow support of a streamlined configuration having an upstream portion adapted to lead in a predetermined direction of advance and having a closed leading edge and an open trailing edge, said trailing edge being bifurcated to establish a slot, a source of spray liquid within said hollow support, and means within said hollow support defining a small orifice open to said source and open opposite to said predetermined direction and disposed well upstream of said slot.

2. A device as in claim 1 including a plurality of said discharge orifices arranged parallel to each other and open a direction opposite in said predetermined direction and substantially in a common plane and all within said hollow support.

3. A device as in claim 2 in which all of said discharge orifices terminate in substantially the same transverse plane spaced upstream of said trailing edge.

4. A device as in claim 1 in which said orifice terminates within said support at a point substantially spaced in said predetermined direction upstream of and away from high velocity currents moving past said trailing edge of said streamlined section of said support.

* * * * *